United States Patent Office 2,823,234
Patented Feb. 11, 1958

2,823,234

NITROGENOUS CONDENSATION PRODUCT

William F. Tousignant, Midland, Mich., assignor to The Dow Chemical Company, Midland, Mich., a corporation of Delaware No Drawing. Application December 19, 1955
Serial No. 553,745

4 Claims. (Cl. 260—566)

This invention relates to a new nitrogenous product and a method for its preparation.

The product of the present invention is obtained by condensing formaldehyde with 1,3-diamino-2-propanol. The condensation product is a white solid, readily soluble in alcohol and water, but of very low solubility in non-polar solvents such as benzene. This substance is employed advantageously as a preservative or antioxidant for materials in which color or color formation would be objectionable. It is especially valuable as a parasiticide for the control of bacterial and fungal organisms.

The condensation product may be prepared by causing substantially two molar proportions of formaldehyde to react with one molar proportion of 1,3-diamino-2-propanol. The condensation takes place when the reactants are mixed together and results in some evolution of heat with the formation of the desired product and water of reaction. Preferred procedures include conducting the reaction in the presence of a solvent such as water or alcohol and with cooling to maintain the temperature at or below 60° C. The rate of combining the reactants is dependent upon the initial temperature, the amount of solvent employed and the efficiency of cooling. On completion of the reaction, a clear, colorless composition is obtained. The water formed during the condensation and the employed solvent optionally may be removed, preferably by vaporization under reduced pressure, to obtain a white solid product.

In practice it appears that from about 1.5 to about 3.0 molar proportions of formaldehyde can be employed for each molar proportion of 1,3-diamino-2-propanol to obtain products comprising significant proportions of the preferred condensation product of the present invention. Such materials are low melting or gummy in nature but have utility in the fungicide and bactericide fields. Unreacted molar excesses of formaldehyde may be separated if desired in the optional step of vaporization under reduced pressure.

The reactants used in the preparation of the product are readily obtainable. The formaldehyde reactant may be employed in any suitable form. Formalin, the commercially available 37 percent aqueous solution of formaldehyde, constitutes a preferred embodiment of the invention. Paraformaldehyde may also be used, conveniently as a water solution or with water present in the reaction mixture.

1,3-diamino-2-propanol may be prepared by several known methods. A convenient process is by the action of ammonia on epichlorohydrin.

In the preferred method for the preparation of the condensation product, an aqueous solution of formaldehyde (such as formalin) is added with stirring and cooling to 1,3-diamino-2-propanol at such a rate as to maintain the reaction temperature in the range of from 40° to 60° C. The resulting clear, aqueous composition may be dehydrated to give a solid product, altho the unmodified aqueous reaction mixture is valuable for many purposes and particularly as a fungicide and bactericide. The removal of water may be carried out in a vacuum oven at 50° C.

The dehydrated product is a white solid readily soluble in water and having a slight amine odor. An aqueous solution containing 45 percent solids has a pH of 9.3. The product is non-polymeric in nature. Examination of the infrared spectrum shows the presence of a carbon to nitrogen double bond. A quantitative determination for the azomethine linkage shows the presence of two azomethine groups in the condensation product. The chemical configuration of the product is thought to be

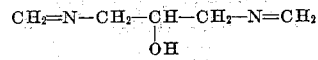

The following examples illustrate the invention.

Example 1

83.3 grams (1.0 mole) of a 37 percent aqueous formaldehyde solution was added dropwise with stirring and cooling to 45.1 grams (0.5 mole) of 1,3-diamino-2-propanol. The temperature was maintained between 40° and 60° C. during the addition, which required 17 minutes. On completion of the addition, the reaction mixture was obtained as a clear, colorless solution. The water was removed therefrom by placing the mixture in a vacuum oven at 50° C. under 25 millimeters pressure for 24 hours. The loss in weight accomplished by this procedure amounted to 69.0 grams. The expected loss in weight calculated on the basis of the water present in the aqueous formaldehyde solution plus the water liberated by the reaction of formaldehyde with amine is 71.3 grams. The dehydrated product was a white, brittle, water-soluble solid melting from 130° to 135° C. The condensation product contained 52.13 percent carbon, 8.65 percent hydrogen and 23.93 percent nitrogen. The theoretical values for the elemental analyses based on the postulated structure of the condensation product are 52.63 percent carbon, 8.77 percent hydrogen and 24.56 percent nitrogen. A molecular weight determination on the product gave a value of 119; the theoretical value is 114. An examination of the infrared spectrum indicated the presence of a carbon to nitrogen double bond, a carbon to oxygen link and either a nitrogen to hydrogen or an oxygen to hydrogen bond.

A quantitative determination for the azomethine group was carried out by hydrolyzing weighed samples of the condensation product with a sodium acetate-hydrochloric acid buffer solution having a pH of 4.5–4.6 and precipitating the formaldehyde released by hydrolysis as a condensation product of 5,5-dimethyl-1,3-cyclohexanedione. This procedure is similar to that described in Industrial and Engineering Chemistry, Analytical Edition, 13,238 (1941) for quantitative determination of formaldehyde. From the weight of the obtained precipitate the percent azomethine group present in the sample was calculated and found to be 47.4 percent. The azomethine group content of a nitrogenous condensation product having the structure given above is 49.16 percent.

Example 2

333.2 grams (4.0 moles) of a 37 percent aqueous formaldehyde solution was added dropwise to 180.3 grams (2.0 moles) of 1,3-diamino-2-propanol while the reaction mixture was stirred and cooled to maintain the temperature at about 50° C. The addition required about one hour. On completion of the addition the reaction mixture was a colorless solution comprising 51.5 percent solids.

The product prepared as described in the preceding examples is useful for the control of bacterial and fungal organisms. In a representative operation, complete inhibition of growth was obtained when nutrient agar plates containing 0.05 percent of the condensation product were swabbed with *Micrococcus Pyogenes* and *Salmonella typhosa* and the plates incubated for four days at 30° C. Check plates exhibited a prolific growth of the test organisms.

I claim:

1. A composition comprising a condensation product obtainable by the reaction of 1.5 to 3.0 molar proportions of formaldehyde with 1.0 molar proportion of 1,3-diamino-2-propanol while the reaction mixture is maintained at a temperature no greater than 60° C.

2. A composition comprising a white, water soluble condensation product obtainable by the reaction of 2.0 molar proportions of formaldehyde with one molar proportion of 1,3-diamino-2-propanol while the temperature is maintained in the range of from 40° to 60° C.

3. A method for preparing a condensation product which comprises the step of condensing 1.5 to 3.0 molar proportions of formaldehyde with 1 molar proportion of 1,3-diamino-2-propanol while the reaction mixture is maintained at a temperature no greater than 60° C.

4. A method for preparing a condensation product which comprises mixing two molar proportions of formaldehyde with one molar proportion of 1,3-diamino-2-propanol in a solvent medium maintained at a temperature of 40° to 60° C. for a time sufficient to allow completion of the resulting reaction.

References Cited in the file of this patent

UNITED STATES PATENTS 2,226,534　　Lichty _____ Dec. 31, 1940